United States Patent
Chwu et al.

(10) Patent No.: US 7,956,960 B2
(45) Date of Patent: *Jun. 7, 2011

(54) DISPLAY PANEL AND METHOD FOR MANUFACTURING THE SAME AND ELECTRO-OPTICAL DEVICE INCLUDING THE DISPLAY PANEL AND METHOD FOR MANUFACTURING THE SAME

(75) Inventors: Jong-wen Chwu, Hsin-Chu (TW); Yu-chen Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/717,125

(22) Filed: Mar. 3, 2010

(65) Prior Publication Data

US 2010/0157219 A1    Jun. 24, 2010

Related U.S. Application Data

(63) Continuation of application No. 11/775,556, filed on Jul. 10, 2007, now Pat. No. 7,738,061.

(30) Foreign Application Priority Data

Feb. 16, 2007 (TW) .............................. 96106245 A

(51) Int. Cl.
*G02F 1/1335* (2006.01)
(52) U.S. Cl. .................................................. 349/112
(58) Field of Classification Search .................. None
See application file for complete search history.

(56) References Cited

U.S. PATENT DOCUMENTS

| 7,294,373 B2 | 11/2007 | Tsuboi et al. |
| 7,738,061 B2 * | 6/2010 | Chwu et al. ............ 349/112 |
| 2005/0007540 A1 | 1/2005 | Tsuboi et al. |
| 2005/0221054 A1 | 10/2005 | Kawano et al. |

FOREIGN PATENT DOCUMENTS

JP    2000114772    4/2000

* cited by examiner

*Primary Examiner* — Sung H Pak

(57) ABSTRACT

A display panel and a manufacturing method are disclosed. The method is to thin the thickness of a pair of transparent substrates for the display panel by grinding or lapping only, or grinding with simplified polishing, so that at least one of the outer surface of the transparent substrates has Haze substantially less than 90% and a profile arithmetic mean roughness ranged from about 0.02 μm to about 0.66 μm.

23 Claims, 6 Drawing Sheets

DISPLAY PANEL AND METHOD FOR MANUFACTURING THE SAME AND ELECTRO-OPTICAL DEVICE INCLUDING THE DISPLAY PANEL AND METHOD FOR MANUFACTURING THE SAME

CROSS REFERENCE TO RELATED APPLICATION

This is a Continuation of a U.S. patent application Ser. No. 11/775,556, filed on Jul. 10, 2007 now U.S. Pat. No. 7,738,061.

TECHNICAL FIELD OF THE INVENTION

The present invention relates to a display panel of an electro-optical device and a method for manufacturing the same, and more particularly, to the method for reducing the manufacturing time of the display panel.

BACKGROUND OF THE INVENTION

With the advancement of manufacturing ability and increasing consumer demands, flat panel displays, such as Plasma Display Panels (PDP), Organic Light Emitting Diode (OLED) panels, Liquid Crystal Panels (LCP) and Field Emission Displays (FED) and the like, are all being mass produced. The Liquid Crystal Display (LCD) panel has advantages of being thin, light weight, low power consumption, and no radiation contamination. In particular, LCD panels are compatible with semiconductor manufacturing techniques. Therefore, the desktop computers, notebooks, cell phones, Personal Digital Assistants (PDAs), etc., are all using LCD panels as the main display device and are already conventionally being used in daily lifestyle by consumers. However, reducing the weight in LCD panels or other panels is still an important objective.

It is known in the art that LCD panels have been made by using glass as the material of a transparent substrate. Since the weight of a pair of transparent substrates is the main weight of the LCD panel, weight reduction of LCD panels can be achieved by thinning the thickness of the transparent substrates.

The conventional technique for thinning the transparent substrates comprises a grinding/lapping and a polishing, the polishing processes are usually performed by a Chemical Mechanical Polishing (CMP) technique Implementation method of the CMP technique comprises filling a slurry (e.g. $SiO_2$, $AL_2O_3$ and $CeO_2$, etc.) into the gaps of the polishing pad, applying a mechanical force to place the polishing pad onto the surfaces of glass. The slurry in the gaps of the polishing pad contains many chemical scattered abrasives, thereby enabling the glass and the abrasives to react with a fast rotational speed. By doing so, a mechanical cutting force and a chemical reaction are provided to the surfaces of the glass so as to increase the efficiencies of the polishing. In order to significantly reduce the thickness of transparent substrate in this step, it is essential to use large and non-uniform abrasives in polishing the surfaces of the transparent substrate. However, the CMP process is not suitable for LCD thinning The CMP process only the removing thickness is below 200 nm and the removing rate is below 800 nm/min Regarding to LCD cell thinning, the removing thickness is from 100 μm to 500 μm and the removing rate is from 3 μm/min to 90 μm/min. For these reasons, we need to grinding/lapping process before polishing process. But it would result in the surfaces of the transparent substrates being extremely rough after the grinding/lapping process.

As described above, the surfaces of the transparent substrates are extremely rough after the grinding/lapping process. In order to avoid increase of error in the following procedure, the transparent substrates with the rough surfaces are not used in the following display panel production procedure. It is necessary to perform a polishing step to the rough surfaces of the transparent substrates after the grinding/lapping process. In the polishing step, planarization of the rough surfaces is done with small and uniform abrasives to further reduce the thickness of the transparent substrates to achieve a predetermined thickness. In prior art, it is necessary to polish both the outer and inner surfaces of the pair of transparent substrates for the display panel until they are smooth and glossy. The polished surface is conventionally known as a mirror surface. Accordingly, other components are able to be disposed on the transparent substrates in following procedures.

However, grinding or lapping a pair of transparent substrates to achieve a predetermined thickness and polishing transparent substrate as the mirror surface take quite a long process time and result in reduction of throughput. For this reason, there is a need to provide a manufacturing method for reducing manufacturing time so as to increase productivity of manufacturing display panels.

SUMMARY OF THE INVENTION

An objective of the present invention is to provide a display panel comprising a pair of transparent substrates. The transparent substrates are manufactured by a simplified thinning process.

Another objective of the present invention is to provide a method for manufacturing the display panel. The method is used for reducing the manufacturing time so as to increase productivity of manufacturing the display panel.

Additionally, a further objective of the present invention is to provide an electro-optical device comprising the display panel manufactured by a simplified thinning process.

Still, another objective of the present invention is to provide a method for manufacturing the electro-optical device. The method is used for reducing the manufacturing time so as to increase productivity of manufacturing the display panel.

In accordance with an aspect of the present invention, the display panel comprises the pair of transparent substrates. At least one of an outer surface of the transparent substrates has a profile arithmetic mean roughness ranged from about 0.02 μm to about 0.66 μm.

In accordance with another aspect of the present invention, the display panel comprises a pair of transparent substrates. At least one of an outer surface of the transparent substrates has a Haze substantially less than 90%.

Furthermore, in accordance with another aspect of the present invention, the method for manufacturing the display panel comprises thinning the thickness of at least one pair of transparent substrates, so that at least one of an outer surface of the transparent substrates has a profile arithmetic mean roughness ranged from about 0.02 μm to about 0.66 μm.

Still, in accordance with a further aspect of the present invention, the method for manufacturing the display panel comprises thinning the thickness of at least one pair of transparent substrates, so that at least one of an outer surface of the transparent substrates has a Haze substantially less than 90%.

Additionally, in accordance with still a further aspect of the present invention, the electro-optical device comprises the display panel, and the display panel also comprises the pair of transparent substrates. At least one of an outer surface of the transparent substrates has a profile arithmetic mean roughness ranged from about 0.02 μm to about 0.66 μm.

Furthermore, still in accordance with another aspect of the present invention, the electro-optical device comprises a display panel, and the display panel also comprises the pair of transparent substrates. At least one of an outer surface of the transparent substrates has a Haze substantially less than 90%.

Moreover, still in accordance with another aspect of the present invention, the display panel manufacturing method for the electro-optical device comprises thinning the thickness of at least one pair of transparent substrates, so that at least one of an outer surface of the transparent substrates has a profile arithmetic mean roughness ranged from about 0.02 μm to about 0.66 μm.

Moreover, still in accordance with another aspect of the present invention, the display panel manufacturing method for the electric-optic device comprises thinning the thickness of at least one pair of transparent substrates, so that at least one of an outer surface of the transparent substrates has a Haze substantially less than 90%.

In order to understand the objects, features and advantages of the present invention described above, the following detailed descriptions are exemplary and explanatory and are intended to provide some preferred embodiments described in details in conjunction with the accompanying drawings.

DETAILED DESCRIPTION OF THE INVENTION

Embodiments of the present invention will be described in detail below.

Figure 6:
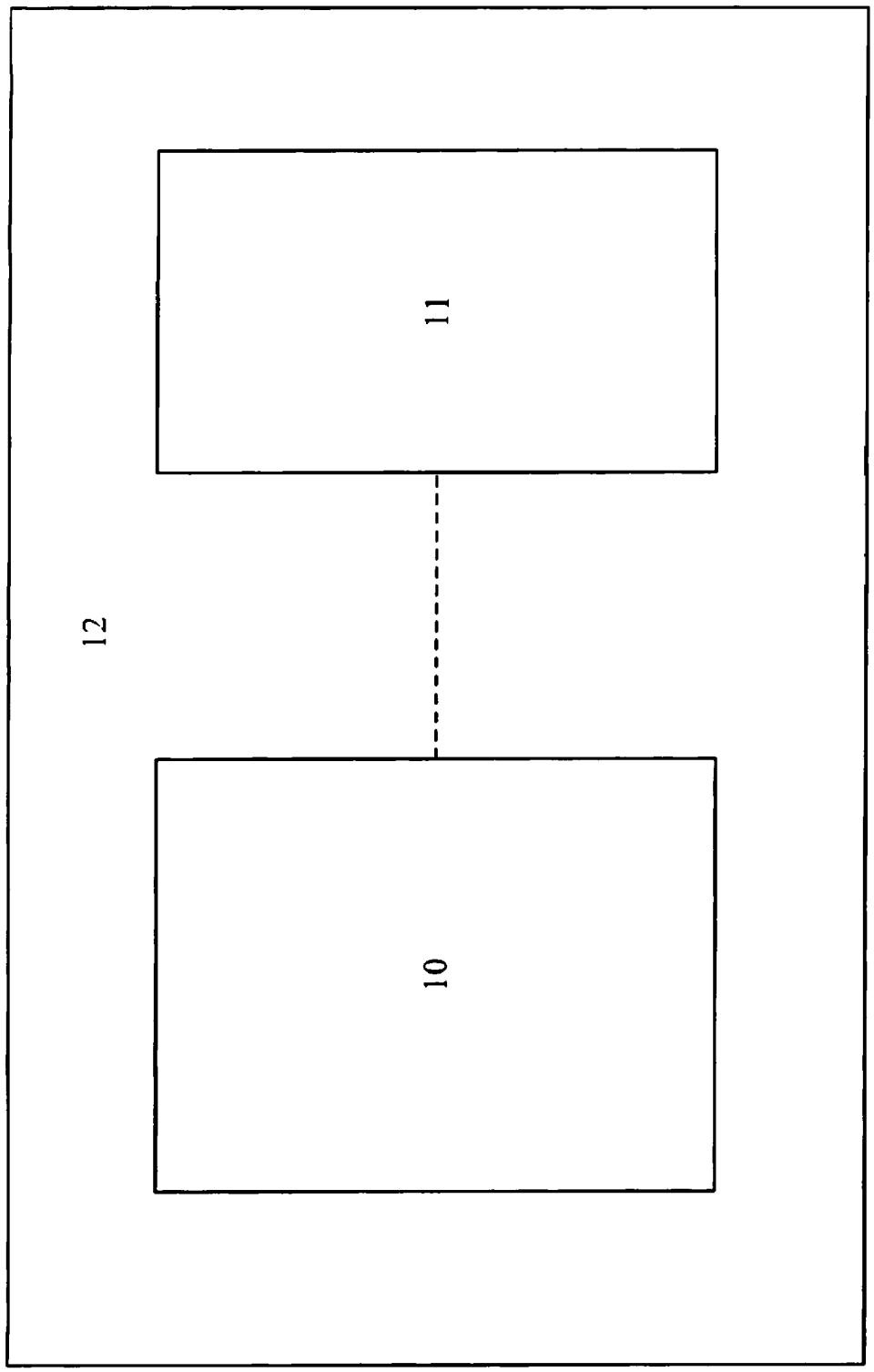
FIG. 6 illustrates a structure of an electric-optic device of the present invention.

The present invention is to manufacture a pair of transparent substrates for a display panel 10 (as shown in FIG. 6) by a thinning process so as to reduce the thickness of the display panel 10, so that at least one of the outer surface of the transparent substrates has a profile arithmetic mean roughness (Ra) ranged from about 0.02 μm to about 0.66 μm, or at least one of the outer surface of the transparent substrates has a Haze substantially less than 90% and the outer surface is unnecessary to be processed as a mirror surface. However, at least one of the outer surface of the transparent substrates also can have a combination of the profile arithmetic mean roughness (Ra) and the Haze.

Figure 1:
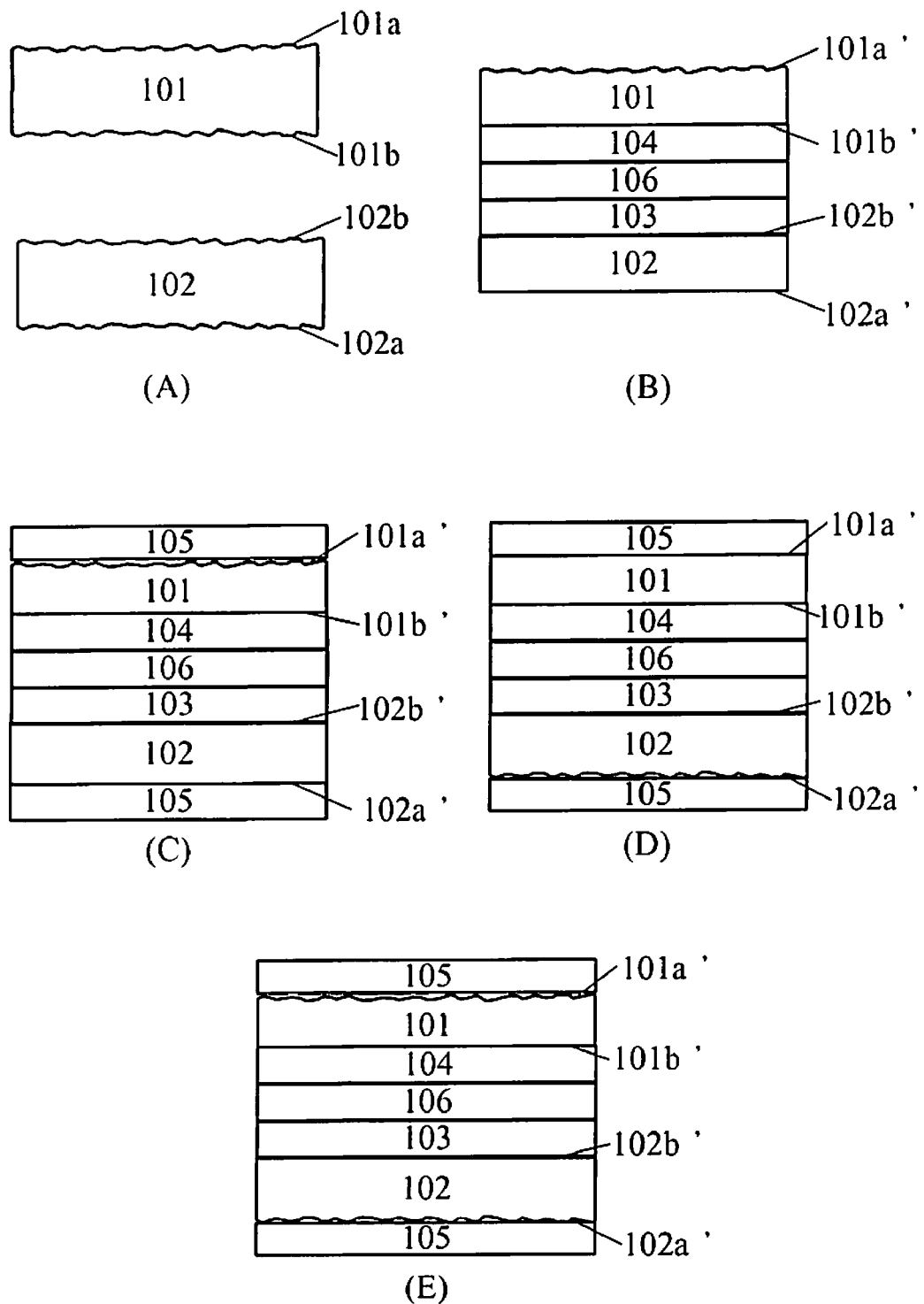
FIGS. 1(A) to (C) are diagrams illustrating the procedure for manufacturing the display panel according to a first embodiment of the present invention.
FIGS. 1(D) to (E) show other forms of the display panel produced by the manufacturing procedure of the first embodiment of the present invention.

FIGS. 1(A) to (C) are diagrams illustrating the procedure for manufacturing the display panel 10 according to a first embodiment of the present invention. Referring to FIG. 1(A), this diagram shows a first transparent substrate 101, and a second transparent substrate 102 opposite to the first transparent substrate 101. A material of at least one of the transparent substrates comprises an inorganic material (such as glass, quartz, or others), an organic material (such as polycarbonate, polyester, polyamide, or others, or a combination thereof) or a combination thereof. The first transparent substrate 101 and the second transparent substrate 102 both are complete substrates without being cut, or cut substrates of suitable sizes for the thinning process. In this embodiment, the first transparent substrate 101 comprises an initial outer surface 101a and an initial inner surface 101b opposite thereto. The second transparent substrate 102 comprises an initial outer surface 102a and an initial inner surface 102b opposite thereto. As shown in, the initial outer surfaces 101a, 102a and initial inner surfaces 101b, 102b are all extremely rough.

Referring to FIG. 1(B), the initial inner surface 101b, the initial outer surface 102a and the initial inner surface 102b are all processed to be a smooth inner surface 101b', a smooth inner surface 102b', and a smooth outer surface 102a' by grinding and polishing. In other words, the smooth inner surface 101b', the smooth inner surface 102b', and the smooth outer surface 102a' like a mirror surface. In this embodiment, the initial outer surface 101a is substantially different from the three surfaces (101b', 102b' and 102a'). The initial outer surface 101a is processed to be a rough outer surface 101a' by grinding only. In other words, the initial outer surface 101a is processed without polishing. However, the initial outer surface 101a also can be processed as a rough outer surface 101a' by grinding and simplified polishing, such as incomplete polishing. Accordingly, the display panel 10 does not occur an image invisibility phenomenon (e.g. an image distortion, a color distortion, or the like) if the rough outer surface 101a' has at least one of a profile arithmetic mean roughness (Ra) ranged from about 0.02 μm to about 0.66 μm and a profile maximum height roughness (Ry) ranged from about 0.18 μm to about 6.0 μm, so that the first transparent substrate 101 can be used in a following production for the display panel 10. Moreover, utilizing a light source (e.g. a D65 light source, a visible light source, a nearly visible light source, or others) to illuminate the first transparent substrate 101, and then measure the first transparent substrate 101 by a Haze meter with a standard formula (e.g. JIS K7136, ISO 14782 etc.). The first transparent substrate 101 is measured as satisfying at least one of the following conditions: Haze is substantially less than 90%, total light transmittance is substantially greater than 85%, defused light transmittance is substantially less than 77% and parallel light transmittance is substantially greater than 8.5%.

As described above, the most important optical property for the rough outer surface 101a' is Haze. Haze should be substantially less than 90%, so that the first transparent substrate 101 can avoid a visible fog occurred. In addition to Haze, preferred, the rough outer surface 101a' also can satisfy at least one of the other optical properties mentioned above, such as one, at two, or at three of the other optical properties mentioned above. The importance of the optical properties for the rough outer surface 101a' is defined by a following sequence: Haze>parallel light transmittance>defused light transmittance>total light transmittance. The optimal status of the rough outer surface 101a' is to satisfy the four optical properties.

In this embodiment, a color filter layer 104 is disposed on the smooth inner surface 101b' and a component layer 103 is disposed on the smooth inner surface 102b' after the transparent substrates are thinned to satisfy the optical properties. The color filter layer 104 at least comprises at least three color-resists and other components such as a black matrix, an alignment component, a support component, a common electrode, or a combination of those. The component layer 103, which comprises a thin-film transistor, a signal line, a capacitor, a pixel electrode, a common electrode line, other components such as an alignment component and a support component, or a combination of those. The thin-film transistor comprises a source, a drain, a gate, an active layer, a dielectric layer, a passivation layer, a planarization layer, or others, or a combination of those. Moreover, a type for the thin-film transistor comprises a top gate type, a bottom gate type, or others, or a combination of those. A material of the active layer comprises an amorphous silicon, a poly silicon, a microcrystalline silicon, single crystalline silicon, or a combination of those. Furthermore, in addition to the material contained silicon, the material of the active layer, preferably, further comprises dopants of N-type, P-type or a combination of those. At least one of the materials of the dielectric layer, the protective layer, and the planarization layer comprise a inorganic material (such as silicon nitride, silicon oxide, silicon oxy-nitride, silicon carbide, or others, or a combination of those), an organic material (such as an organo-silicon compound, a polyamide, a polyester, a photoresist, or others, or a combination of those), or combinations thereof. A layer 106 with a dielectric constant is disposed between the component layer 103 and the color filter layer 104. The material of the layer 106 with the dielectric constant comprises a liquid-crystal material, a luminous material (such as an inorganic material, an organic material, others, or a combination of those), or combinations thereof. Moreover, an alignment film (not shown in this figure) is disposed on at least one of the surface of the color filter layer 104 and the component layer 103.

Referring to FIG. 1(C), the optical film 105 is disposed on at least one of the outer surface of the first transparent substrate 101 and the second transparent substrate 102. In this embodiment, the optical films 105 are respectively disposed on the rough outer surface 101a' and the smooth outer surface 102a' as an exemplification. If the transparent substrate has a refractive index N, then an adhesive for respectively adhering the optical films 105 on the rough outer surface 101a' and the smooth outer surface 102a' has a refractive index ranged from 1 to (2N−1). Each optical film 105 comprises a compensation film, a polarizing film, a brightness enhancement film, a light transmittance reflective selection film, a polarizing plate, a wavelength selection sheet, others, or a combination of those. Subsequently, each optical film 105 also has a profile arithmetic mean roughness (Ra) substantially greater than or substantially less than the profile arithmetic mean roughness (Ra) of the rough outer surface 101a'. However, the profile arithmetic mean roughness (Ra) of the optical film 105 also can be substantially equal to the profile arithmetic mean roughness (Ra) of the rough outer surface 101a'.

In this embodiment, although the outer surface of the first transparent substrate 101 is processed to have the required profile roughness or satisfy the required optical properties by grinding or grinding and simply polishing, and then the components and layers are disposed between the first transparent substrate 101 and the second transparent substrate 102 for manufacturing the complete display panel 10. The present invention should not be limited to the particular forms as described herein. The first transparent substrate 101 also can satisfy the required optical properties by grinding or grinding and simplified polishing after the first transparent substrate 101 has been manufactured as the complete display panel 10, and before the optical films 105 are disposed on at least one of the outer surface of the first transparent substrate 101 and the second transparent substrate 102. In additional, the inner surface of the first transparent substrate 101 and both surfaces of the second transparent substrate 102 are all processed to be the mirror surfaces.

As described above, although the outer surface of the first transparent substrate 101 as an exemplification and satisfy at least one required optical property. The present invention should not be limited to the particular forms as described. The outer surface of the second transparent substrate 102 also can be processed as a rough outer surface, but the outer surface of the first transparent substrate 101 also can be processed as a mirror surface as shown in FIG. 1(D). Or, the outer surfaces of the second transparent substrate 102 and the first transparent substrate 101 also can be both processed as the rough outer surfaces as shown in FIG. 1(E).

Figure 2:
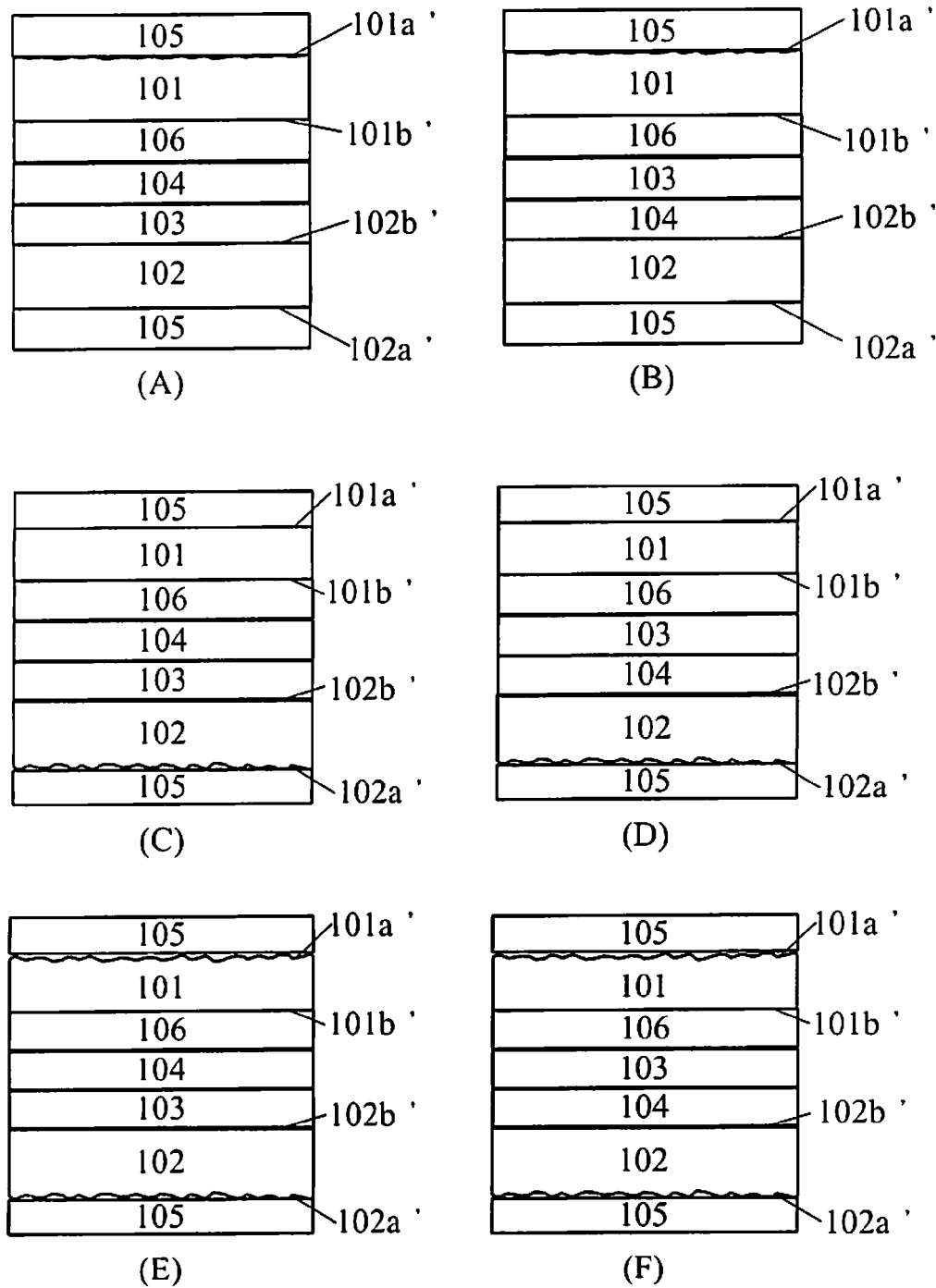
FIGS. 2(A) to (F) show various forms of the display panel according to a second embodiment of the present invention.

Referring to FIGS. 2(A) to (F), the drawings show various forms of the display panel according to a second embodiment of the present invention. In this embodiment, the sequence of the layers arrangement is substantially different from the first embodiment, but all components are the same. Therefore, the descriptions of the components will be omitted herein for the sake of simplification. The color filter layer 104 and the component layer 103 are both disposed on the smooth inner surface 102b', and the layer 106 with the dielectric constant is disposed between the smooth inner surface 101b' and the smooth inner surface 102b'. In addition, to the arrangement of the color filter layer 104 and the component layer 103 can be a color filter on array (COA) type or an array on color filter (AOC) type. That is, if the color filter layer 104 disposed above the component layer 103 as shown in FIG. 2(A), such an arrangement is conventionally called a COA type. Otherwise, if the component layer 103 disposed above the color filter layer 104 as shown in FIG. 2(B), then such an arrangement is conventionally called an AOC type. On the other hand, the layer 106 with the dielectric constant is disposed between the first transparent substrate 101 and the color filter layer 104, or disposed between the first transparent substrate 101 and the component layer 103. It is noted that, a common electrode (not shown in this figure) also can be disposed on the smooth inner surface of the first transparent substrate 101. The other components such as a black matrix, an alignment component, a support component and the like, or a combination of those, also can be disposed on at least one of the inner surface of the first transparent substrate 101 and the second transparent substrate 102. Furthermore, an alignment film (not shown in this figure) preferred, is disposed on at least one of the inner surface of the first transparent substrate 101, the color filter layer 104, and the component layer 103. In addition, the optical film 105 is disposed on at least one of the outer surface of the first transparent substrate 101 and the second transparent substrate 102. In this embodiment, the optical films 105 are respectively disposed on the rough outer surface 101a' and the smooth outer surface 102a' as an exemplification. Each optical film 105 comprises a compensation film, a polarizing film, a brightness enhancement film, a light transmittance reflective selection film, a polarizing plate, a wavelength selection sheet, or others, or a combination of those. Moreover, each optical film 105 also has a profile arithmetic mean roughness (Ra) substantially greater than or substantially less than the profile arithmetic mean roughness (Ra) of the rough outer surface 101a'. However, the profile arithmetic mean roughness (Ra) of the optical film 105 also can be substantially equal to the profile arithmetic mean roughness (Ra) of the rough outer surface 101a'.

Although, the outer surface of the first transparent substrate 101 satisfy at least one optical property to illustrated, but is not be limited thereto. The outer surface of the second transparent substrate 102 as can be processed as the rough surface, but the outer surface of the first transparent substrate 101 also can be processed as the mirror surface as shown in FIGS. 2(C) to (D). However, the outer surface of the first transparent substrate 101 also can be processed as a rough surface as shown in FIGS. 2(E) to (F).

A decision for the specifically range of aforementioned embodiments depended on will be explained in detail below. Referring to Table. 1, shows a relationship between the profile arithmetic mean roughness (Ra) and optical properties (such as Haze, total light transmittance, defused light transmittance, and parallel light transmittance), wherein the optical properties showed in Table. 1 are measured by the haze meter:

TABLE 1 the relationship between the profile arithmetic mean roughness (Ra) and the optical properties.

| Profile arithmetic mean roughness (Ra) | Profile maximum height roughness (Ry) | Haze | Total light Transmittance | Defused light Transmittance | Parallel light Transmittance |
|---|---|---|---|---|---|
| 0.02 μm | 0.18 μm | 1.1% | 91.1% | 1.0% | 90.0% |
| 0.05 μm | 0.63 μm | 8.9% | 91.3% | 8.1% | 83.1% |
| 0.07 μm | 0.8 μm | 18.7% | 90.5% | 17.1% | 73.6% |
| 0.15 μm | 1.44 μm | 64.9% | 89.3% | 57.9% | 31.3% |
| 0.25 μm | 2.41 μm | 80.7% | 89.7% | 72.4% | 17.3% |
| 0.49 μm | 3.19 μm | 88.6% | 84.8% | 75.1% | 9.7% |
| 0.66 μm | 5.97 μm | 90.1% | 86.1% | 77.6% | 8.5% |

In accordance with Table. 1, Haze is substantially about 1.1%, total light transmittance is substantially about 91.1%, defused light transmittance is substantially about 1.0%, and parallel light transmittance is substantially about 90.0%, when at least one of the outer surface of the transparent substrates has at least one of the profile arithmetic mean roughness (Ra) substantially about 0.02 μm and the profile maximum height roughness (Ry) substantially about 0.18 μm. In this case, the other three surfaces of the transparent substrates are mirror surfaces. Subsequently, Haze is substantially about 90.1%, total light transmittance is substantially about 86.1%, defused light transmittance is substantially about 77.6%, and parallel light transmittance is substantially about 8.5%, when at least one of the outer surface of the transparent substrates has at least one of the profile arithmetic mean roughness (Ra) substantially about 0.66 μm and the profile maximum height roughness (Ry) substantially about 5.97 μm. In this case, the other three surfaces of the transparent substrates are mirror surfaces. However, Haze is substantially greater than 90%, total light transmittance is substantially less than 85%, defused light transmittance is substantially greater than 77%, and parallel light transmittance is substantially less than 8.5%, when at least one of the outer surface of the transparent substrates has the profile arithmetic mean roughness (Ra) substantially greater than 0.66 μm or the profile maximum height roughness (Ry) substantially greater than 6.0 μm (not shown in this table). In this case, the other three surfaces of the transparent substrates are mirror surfaces. Under such a condition, a visible fog will occur if the optical film 105 disposed on at least one of the outer surface of the first transparent substrate 101 and the second transparent substrate 102. Therefore, the present invention preferably suggests at least one of a range for the profile arithmetic mean roughness (Ra) to be substantially from about 0.02 μm to about 0.66 μm and a range for the profile maximum height roughness (Ry) to be substantially from about 0.18 μm to about 6.0 μm.

In the embodiments mentioned above, at least one of the outer surface of the transparent substrates is processed by grinding, so that the transparent substrates not only achieve the predetermined thickness, but each outer surface of the transparent substrates also can satisfy the required optical properties or/and has the required profile roughness. In light of the description above, the transparent substrate also can satisfy the required optical properties by grinding and simplified polishing. That is, even in the polishing step, it is unnecessary to polish each surface of the transparent substrates as a mirror surface. In the other words, in order to reduce the manufacturing time, at least one of the outer surface of the transparent substrates is unnecessary to be processed as a mirror surface.

In addition, by way of the experiment to know Haze is substantially greater than 88%, total light transmittance is substantially less than 85%, defused light transmittance is substantially greater than 77%, and parallel light transmittance is substantially less than 10%, when the outer surfaces of the transparent substrates are respectively processed to have at least one of the profile arithmetic mean roughness (Ra) substantially greater than 0.5 μm and the profile maximum height roughness (Ry) substantially greater 4.0 μm. Under such a condition, a visible fog will occur if the optical film 105 is disposed on at least one of the outer surface of the first transparent substrate 101 and the second transparent substrate 102. Therefore, the present invention preferably suggests at least one of a range for the profile arithmetic mean roughness (Ra) to be substantially from about 0.02 μm to about 0.5 μm and a range for the profile maximum height roughness (Ry) to be substantially from about 0.18 μm to about 4.0 μm.

As described above, at least one of the outer surface of the transparent substrates is processed by grinding, so that the transparent substrates not only achieve the predetermined thickness, but at least one of the outer surface of the transparent substrates also can satisfy at least one of the required optical properties and the required profile roughness. In light of the description above, the transparent substrate also can satisfy the required optical properties by grinding and simplified polishing. That is, even in the polishing step, it is unnecessary to polish each surface of the transparent substrates as a mirror surface. In the other words, in order to reduce the manufacturing time, at least one of the outer surface of the transparent substrates is unnecessary to be processed as a mirror surface.

A decision of the prevent invention for unnecessary to polish at least one of the outer surface of the transparent substrates as a mirror surface depended on will be explained in detail below. Referring to Table. 2, it shows various profile arithmetic mean roughness (Ra) and profile maximum height roughness (Ry). All values are measured after different polishing times:

TABLE 2 the relationship between the profile arithmetic mean roughness, the profile maximum height roughness, and the polishing time.

| | | Profile arithmetic mean roughness (Ra) | Profile maximum height roughness (Ry) |
|---|---|---|---|
| A | Smooth surface | 0.02 μm | 0.17 μm |
| B | Polished in 25 minutes | 0.02 μm | 0.17 μm |
| C | Polished in 20 minutes | 0.04 μm | 0.29 μm |
| D | Polished in 15 minutes | 0.03 μm | 0.38 μm |
| E | Polished in 12 minutes | 0.04 μm | 0.43 μm |
| F | Polished in 10 minutes | 0.03 μm | 0.59 μm |
| G | Polished in 5 minutes | 0.09 μm | 1.72 μm |
| H | Rough surface | 0.55 μm | 4.38 μm |

In accordance with Table. 2, the profile arithmetic mean roughness (Ra) and the profile maximum height roughness (Ry) are both dramatically varied after 5 minutes of the polishing time. However, in the following polishing time, the profile arithmetic mean roughness (Ra) and the profile maximum height roughness (Ry) are respectively kept a slight and stable variation, and no obvious increment occurred. On the other hand, the outer surfaces are unnecessary to be polished as the mirror surfaces indeed.

Figure 3:
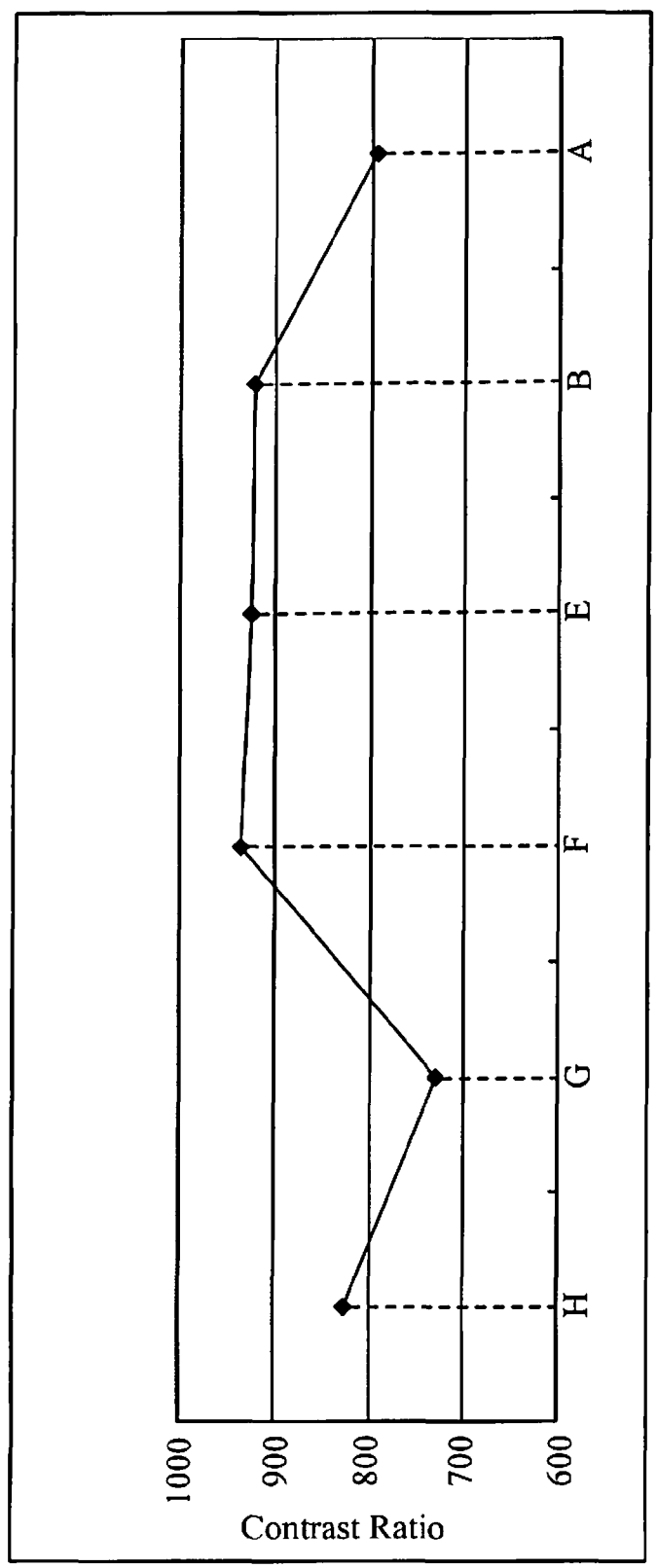
FIG. 3 illustrates a relationship between contrast and polishing time of the present invention.

Referring to FIG. 3, a relationship between a contrast and the polishing time of the present invention is illustrated. Referring to the first embodiment with this diagram. The capitals A, B, E, F, G, and H indicate the different polishing times showed in Table. 2. Although the curve line has some variations in the diagram, all variations are in an accept range. Therefore, the contrast and the polishing time are substantially uncorrelated indeed or not relationship indeed.

Figure 4:
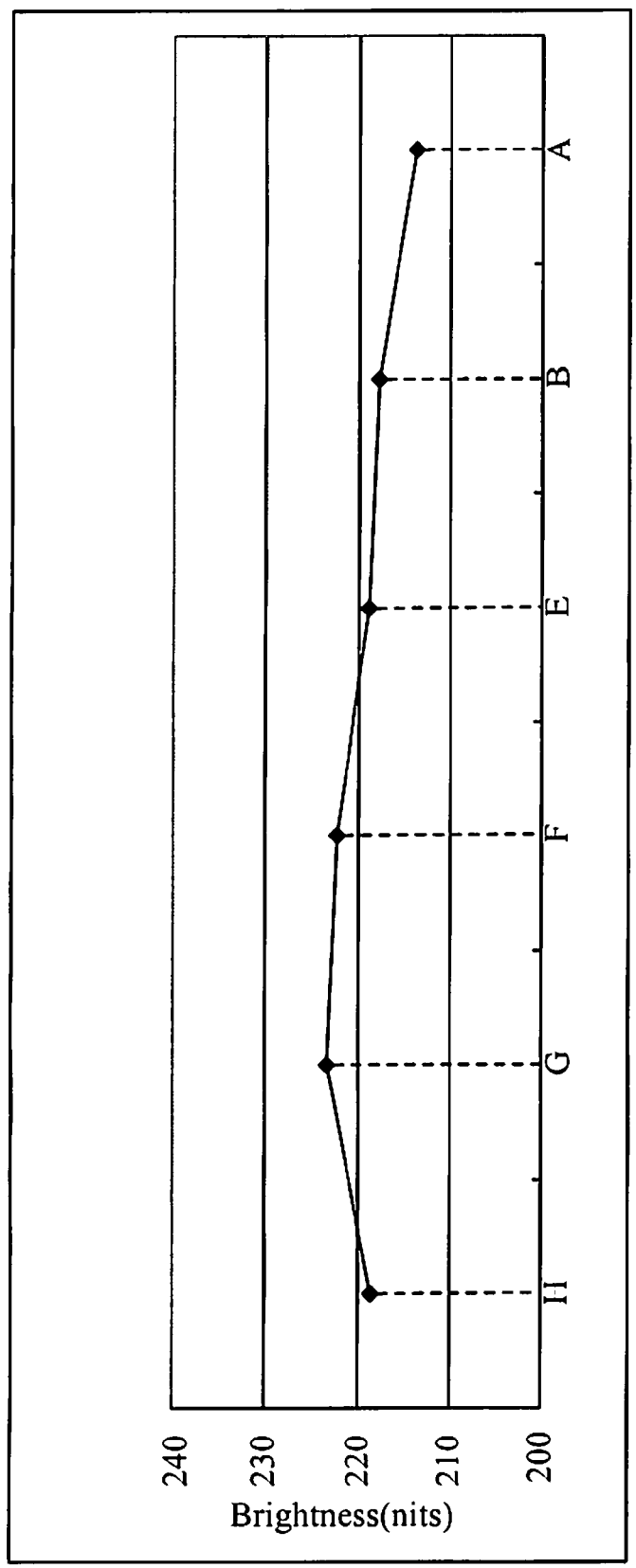
FIG. 4 illustrates a relationship between brightness and polishing time of the present invention.

Referring to FIG. 4, a relationship between a brightness and the polishing time of the present invention is illustrated. Referring to the first embodiment with this diagram. The capitals A, B, E, F, G, and H indicate the different polishing times showed in Table. 2. Although the curve line has some variations in the diagram, all variations are in an accept range. Therefore, the brightness and the polishing time are substantially uncorrelated indeed or not relationship indeed.

Figure 5:
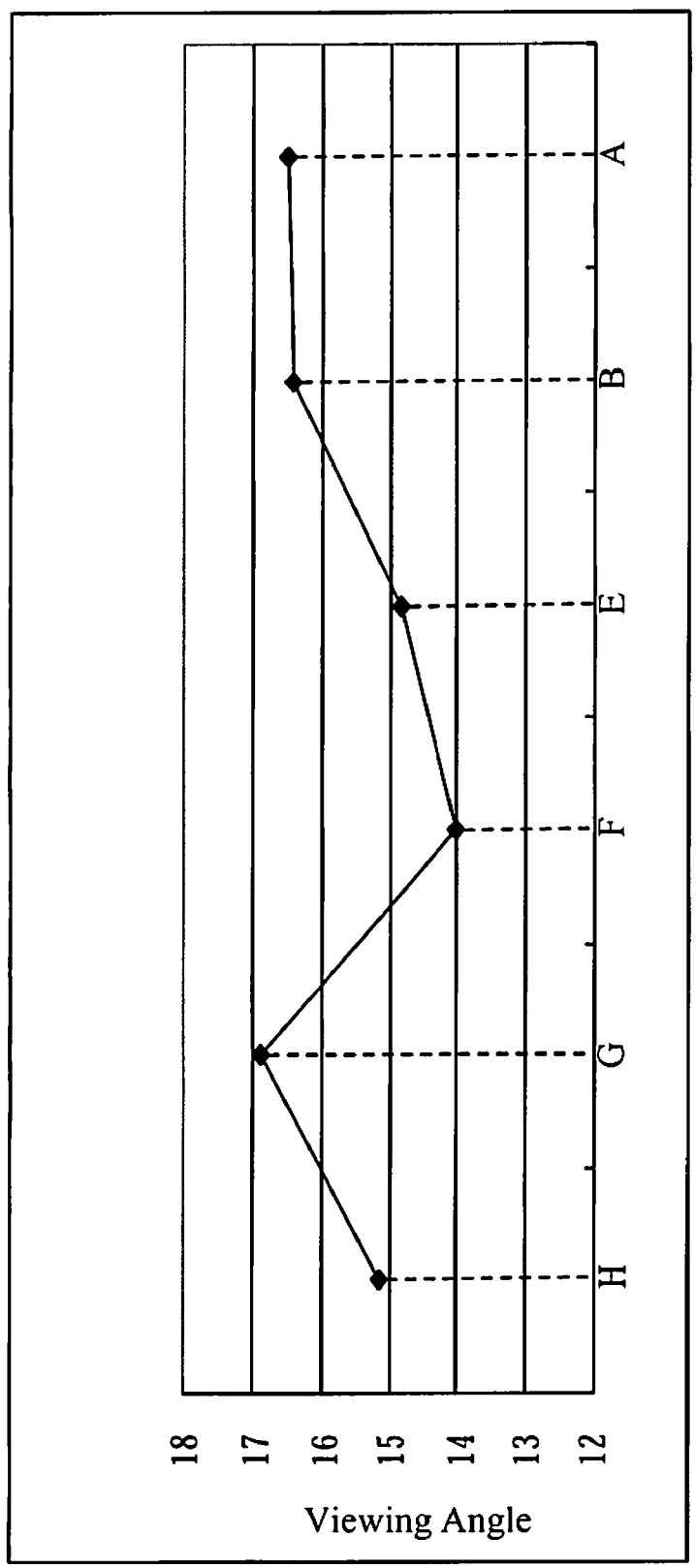
FIG. 5 illustrates a relationship between viewing angle and polishing time of the present invention.

Referring to FIG. 5, a relationship between a viewing angle and the polishing time of the present invention is illustrated. Referring to the first embodiment with this diagram. The capitals A, B, E, F, G, and H indicate the different polishing time showed in Table. 2. Although the curve line has some variations in the diagram, all variations are in an accept range. Therefore, the viewing angle and the polishing time are substantially uncorrelated indeed or not relationship indeed.

As described above, the optical data (the contrast, the brightness and the viewing angle) within a specific range are substantially equal to the conventional optical data (the contrast, the brightness and the viewing angle) obtained after polishing, thus the optical data are uncorrelated with or not relationship with the polishing time. Therefore, the present invention verifies the acceptable display panel can be manufactured if at least one of the outer surface of the transparent substrates is processed by simplified polishing or even without polishing, so that the present invention can effectively reduces the manufacturing time for the display panel. Furthermore, referring to FIG. 3, FIG. 4, and FIG. 5, the most important factors for effecting the optical properties are other factors such as a variety of light source, a way to fabricate the backlight module, a variety of the optical film, or others. However, if a better contrast is to be obtained, then the transparent substrate should be polished from 10 minutes to 25 minutes of the polishing time. In this case, other factors such as a variety of light source, a way to fabricate the back light module, a variety of the optical film, or others are eliminated.

Referring to FIG. 6, a structure of an electro-optical device 12 of the present invention. The electro-optical device 12 comprises the display panel 10 and an electronic component 11. The possible types of the electro-optical device 12 comprise a portable product (e.g. a cell phone, a video camera, a camera, a notebook, a game console, a watch, a music player, an electronic photo, digital photo-frame, an e-mail transceiver, and a map navigation device, or others), a monitor, a television, a indoor/outdoor billboard, a panel of an projector, or others. The electronic component 11 comprises a control component, an operating component, a process component, an input component, a memory component, a driving component, a luminous component, a protective component, a sensory component, a detective component, or others, or a combination of those. The display panel 10 comprises a liquid crystal display panel or an organic electroluminescence display panel, and the panel is determined the type thereof depending on the material of the layer with the dielectric constant such as a liquid crystal material, a luminous material, or a combination of those. Furthermore, at least one pixel electrode and drain of the display panel is electrically contacted with the material of the layer with the dielectric constant. The luminous material comprises an inorganic material, an organic material, or a combination of those. At least one of inorganic material and organic material comprises a high molecular polymer, a low molecular polymer, or a combination of those.

While the preferred embodiments of the present invention have been described in details, various modifications and alterations can be made by persons skilled in this art. The embodiments of the present invention are therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. A display panel comprising:
   a pair of transparent substrates; and
   a layer with a dielectric constant disposed between the inner surfaces of the transparent substrates, and at least one of an outer surface of the transparent substrates has Haze substantially less than 90% and a profile maximum height roughness ranged from about 0.18 μm to about 6.0 μm.

2. The display panel according to claim 1, wherein the at least one of the outer surface of the transparent substrates has total light transmittance substantially greater than 85%.

3. The display panel according to claim 1, wherein the at least one of the outer surface of the transparent substrates has defused light transmittance substantially less than 77%.

4. The display panel according to claim 1, wherein the at least one of the outer surface of the transparent substrates has parallel light transmittance substantially greater than 8.5%.

5. The display panel according to claim 1, wherein the at least one of the outer surface of the transparent substrates comprising an optical film disposed thereon.

6. The display panel according to claim 5, wherein the optical film has the profile arithmetic mean roughness substantially different from the profile arithmetic mean roughness of the at least one of the outer surface of the transparent substrates.

7. The display panel according to claim 5, wherein the optical film has the profile arithmetic mean roughness substantially equal to the profile arithmetic mean roughness of the at least one of the outer surface of the transparent substrates.

8. The display panel according to claim 5, wherein the optical film comprising a compensation film, a polarizing film, a brightness enhancement film, a light transmittance reflectivity selection film, a polarizing plate, a wavelength selection sheet, or combinations thereof.

9. The display panel according to claim 1, wherein one of the inner surface of the transparent substrates comprising a component layer disposed thereon, and the other one inner surface comprising a color filter layer disposed thereon.

10. The display panel according to claim 1, wherein one of the inner surface of the transparent substrates comprising the component layer and the color filter layer both disposed thereon.

11. The display panel according to claim 1, wherein a material of the layer with the dielectric constant comprising a liquid crystal material, a luminous material, or a combinations thereof.

12. An electric-optic device incorporating the display panel according to claim 1.

13. A method for manufacturing a display panel, said method comprising:
providing a pair of transparent substrates; and
thinning the thickness of at least one of the transparent substrates, so that at least one of the outer surface of the transparent substrates has Haze substantially less than 90% and a profile maximum height roughness ranged from about 0.18 µm to about 6.0 µm.

14. The method for a display panel according to claim 13, further comprising disposing a layer with a dielectric constant between the inner surfaces of the transparent substrates.

15. The method for a display panel according to claim 14, wherein a material of the layer with the dielectric constant comprising a liquid crystal material, a luminous material, or combinations thereof.

16. The method for a display panel according to claim 13, further comprising disposing a component layer on one of the inner surface of the transparent substrates, and disposing a color filter layer on the other one.

17. The method for a display panel according to claim 13, further comprising disposing the component layer and the color filter layer both on one of the inner surface of the transparent substrates.

18. The method for a display panel according to claim 13, further comprising disposing an optical film on the at least one of the outer surface of the transparent substrates.

19. The method for a display panel according to claim 18, wherein the optical film comprising a compensation film, a polarizing film, a brightness enhancement film, a light transmittance reflectivity selection film, a polarizing plate, a wavelength selection sheet, or combinations thereof.

20. The method for a display panel according to claim 13, wherein the at least one of the outer surface of the transparent substrates has total light transmittance substantially greater than 85%.

21. The method for a display panel according to claim 13, wherein at least one outer surface of the transparent substrates has defused light transmittance substantially less than 77%.

22. The method for a display panel according to claim 13, wherein the at least one of the outer surface of the transparent substrates has parallel light transmittance substantially greater than 8.5%.

23. A method for manufacturing an electro-optical device incorporating the display panel according to claim 13.

* * * * *